Figure 1:
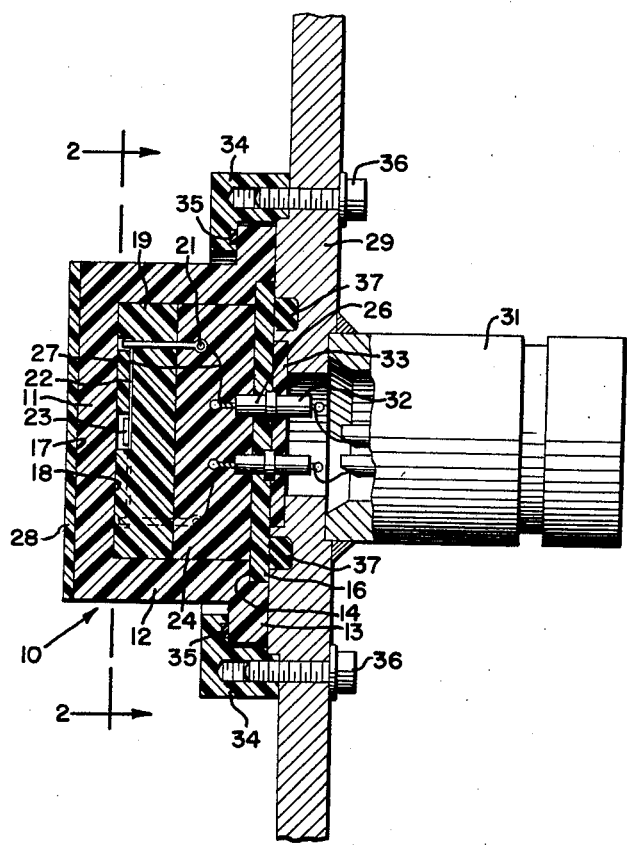

March 17, 1964 M. J. BORGOYN ETAL 3,125,684
SEALED STANDARDIZED LIGHT TRANSDUCER
Filed March 12, 1962

INVENTORS.
MILTON J. BORGOYN
JAMES T. WASDYKE
BY
ATTYS.
AGENT

United States Patent Office 3,125,684
Patented Mar. 17, 1964

3,125,684
SEALED STANDARDIZED LIGHT TRANSDUCER
Milton J. Borgoyn, Glen Burnie, and James T. Wasdyke, Chevy Chase, Md., assignors, by mesne assignments, to the United States of America as represented by the Secretary of the Navy
Filed Mar. 12, 1962, Ser. No. 179,261
1 Claim. (Cl. 250—239)

This invention generally relates to light measuring transducers and more particularly to light measuring transducers capable of extreme environmental conditions experienced in military applications and which may readily be standardized thereby allowing replacement of defective units without the necessity of recalibration each time a new unit is used.

In the field of light transducers, it has been the general practice to employ light sensitive materials such as selenium, thallium, tellurium, silver oxide, bismuth sulfide, or the like. Each of these materials has the characteristic of undergoing a variation in electrical resistance as a function of the intensity and the nature of the radiant energy impinging upon the device such that the devices responsive change in electrical resistance may be utilized to measure the character and intensity of the incident energy. The characteristic of these materials is also such that they undergo a variation in electrical resistance in accordance with variation in humidity and the accumulation of dust or fungus, therefore, making it necessary to hermetically seal the active portion of the transducer within a housing.

Although the prior art devices have served their purpose, they have not proved entirely satisfactory under all conditions of service, particularly those environments experienced in use with modern submarines which include temperature extremes from the arctic to the tropics, both in air and in water, and the thermal shock brought about by submarine submergence in the oceans to operational depths. Further difficulties have been encountered in matching light transducers one with another such that the replacement of defective units with new units will produce compatible data without the necessity of re-calibration of the measuring equipment.

In accordance with the present invention, an improved enclosure and housing is provided for a photosensitive resistance element, the construction of the housing being such as to readily enable standardization of the transducer by comparison with a standard photoelectric cell. Briefly, the unit comprises a piece of Lucite bar stock machined to U-like shape to form a window which is polished until optically clear and undistorted. The light sensitive element is installed within the Lucite housing adjacent the underside of the window and an encapsulating material is poured into the remaining space to hermetically seal the element within the outer housing. Before the encapsulating material has set, a Lucite disc containing two male terminals respectively connected to the light sensitive cell is cemented in place. A thin wafer of milky white plastic or Lucite is cemented to the outside surface of the window and a reading in microamperes is taken under a controlled light source. This reading is compared with the reading of a standard cell and the difference in these readings is used to determine the amount of material to be machined from the milky white plastic. By properly machining the milky white plastic the amount of light from a controlled light source impinging upon the photosensitive element may be closely controlled thereby providing a means for readily matching the light transducers.

It is therefore a general object of the present invention to provide an improved housing structure for a photoelectric cell or similar device.

A more specific object of the present invention is to provide an improved housing structure capable of protecting a light sensitive element from the extreme environments encountered by operational submarines.

Another object is to provide a light measuring transducer readily adapted to standardization.

Still another object is to provide a light transducer which may readily be replaced with a new unit.

A further object of the invention is to provide an improved method of making a light transducer by which a standardized unit may be readily produced.

Yet another object is to provide an improved method of matching or standardizing light measuring transducers.

Figure 2:
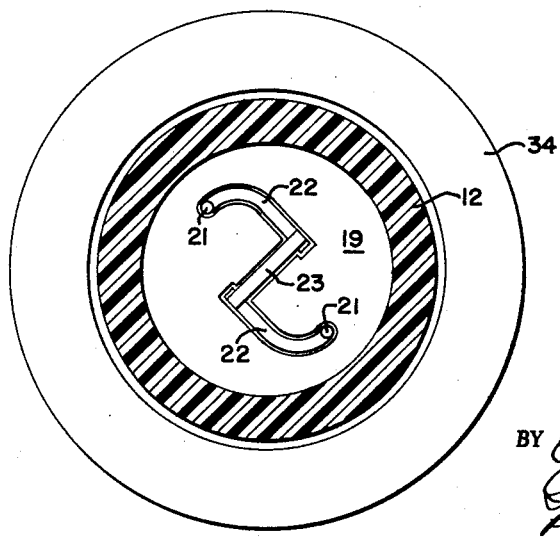

Other objects and many of the attendant advantages of this invention will be more readily appreciated as the same becomes better understood by reference to the following detailed description when considered in connection with the accompanying drawing wherein:

FIG. 1 illustrates a light transducer constructed in accordance with the principles of the present invention; and FIG. 2 is a section taken along line 2—2 of FIG. 1.

Referring now to the details of FIGS. 1 and 2 of the drawing wherein like reference numerals indicate like parts there is illustrated, generally indicated by the numeral 10, a U-shaped housing having a transparent window portion 11 and a cylindrical side wall portion 12 integrally formed therewith. Integrally formed with the side wall 12 is a mounting flange or rim 13 having an outer diameter greater than the diameter of the cylindrical side wall and being located at the end portion of the side wall most remotely removed from the window 11. The inner diameter of the side wall 12 is increased over a short length to form a recess 14 in the rimmed end portion to receive terminal plate 16 for reasons that will hereinafter become more readily apparent as the description proceeds.

The housing 10 is preferably formed from a piece of Lucite bar stock machined to the configuration illustrated in FIG. 1, the outer and inner sides 17 and 18 respectively of window 11 being polished until optically clear and undistorted. Closely fitted within the side wall 12 and abutting the inside surface 18 of window 11 is a circular cell support disc 19 which carries adjacent the window 11 the photoresistance element 23 as best illustrated in FIG. 2. The disc 19 may be constructed of Lucite, glass, or any other suitable insulating material and may be etched or otherwise recessed to receive the light sensitive element 23 and the necessary connecting means 22 thereby leaving a flat planar surface which may be brought into abutting relation with the window 18 without damage to the photosensitive resistance element.

A pair of metallic prongs or leads 21 extend through and are supported within the disc 19 and may be cemented therein be any suitable means. Separate electrical conducting means 22 are connected respectively to prongs or leads 21 to form a gap across which the light sensitive resistance 23 is placed. The electrical conductive means 22 may be either metal foil or a conducting silver paste consisting of particles of metallic silver suspended in a plastic carrier and characterized by its ability to conduct an electric current while imposing a small resistance thereto. In such case, the light sensitive resistance 23 may be placed across the gap while the silver paste is in the undried condition and held in place until the paste is dry thereby cementing the resistance element 23 in the desired position.

It should be understood that the particular light sensitive resistance configuration forms no part of this invention and is illustrated in the drawings by way of example only, it being understood that the particular light sensitive element and the method of connection may take any well known form a second example of which is illustrated in U.S. Patent No. 2,114,591.

The remaining portion of the cavity within the housing 10 is filled with an epoxy resin 24 to hermetically seal the photoelectric cell or light sensitive resistance 23 within the housing. Before the resin has set, the terminal plate 16 containing two male terminals 26 respectively connected by wires 27 to leads 21 to form a series circuit is cemented within the recess 14.

A thin, translucent wafer of milky white plastic or Lucite 28 is cemented to the outer surface 17 of window 11 and a reading of the light measuring transducer is taken in microamperes under a controlled light source. By machining off the outer surface of disc 28, the amount of light impinging upon the photoelectric cell may be increased thereby affording a means of matching or standardizing the transducers such that the units may be interchanged without necessity of recalibration each time a new unit is used. In practice, it has been found that the microampere output of the transducers under similar light conditions may readily be brought within 3%.

The structure 29 to which the transducer is to be secured has a connecting cable 31 secured to the side opposite thereof by any suitable means and appropriate connections are made to the female terminals 32 secured within the mounting board terminal plate 33 carried within the outer surface of the mounting structure 29. The transducer may be secured to the mounting board by a cylindrical L-shaped housing clamp 34 which is fitted over the flanged end portion or rim 13 of the side wall 12 and may be sealed thereto by any suitable means, if desired, as, for example, by O-ring 35. The housing clamp which may be of any suitable material is secured to the mounting board 29 by a plurality of circumferentially spaced screws 36 threaded into the housing clamp. If desired, the mounting board 29 may be recessed to receive a seal such, for example, as the pressure seal 37.

As is obvious to one skilled in the art, the light transducer hereinbefore described lends itself to ready replacement by merely removing bolts 36, pulling the transducer from its housing, and replacing it with a new unit. Further, by machining the milky white disc covering the outer surface of the window, matching large numbers of units, one to the other, is readily accomplished thereby allowing replacement of the transducer unit without the necessity of recalibration of the measuring equipment used therewith. The single unitary U-shaped housing structure having the light admitting window and the side walls integrally formed affords greater protection to the light sensitive material and greater ease in hermetically sealing the unit than has heretofore been possible in prior art devices.

Obviously many variations and modifications of the present invention are possible in light of the foregoing teachings. It is therefore to be understood, that within the scope of the appended claim, the invention may be practiced otherwise than as specifically described.

What is claimed as new and desired to be secured by Letters Patent of the United States is:

A standardized hermetically sealed light measuring transducer comprising a cylindrical U-shaped housing having a flat cylindrical transparent window polished until optically clear and undistorted, a hollow cylindrical side wall integrally formed along the outer circumference of said window, said side wall having an enlarged rim portion at the end most remote from said window, a light sensitive element, a cell support disc having a recess on one surface for receiving said light sensitive element, said cell support disc being positioned within said cylindrical side wall with said light sensitive element adjacent to said window, a circular terminal plate sealed to the enlarged rim portion of said side wall to form a closed container for said light sensitive element, encapsulating material completely filling the space between said terminal plate and said cell support disc to hermetically seal from the surrounding medium said light sensitive element, a pair of electrical current conducting means connected to said light sensitive element and passing through said terminal board adapted to be electrically connected to an external circuit, and a milky white translucent plastic disc attached to the external surface of said flat cylindrical transparent window having a thickness dependent upon the electrical output of said light sensitive transducer when subjected to a predetermined standard quantity of illumination.

References Cited in the file of this patent

UNITED STATES PATENTS

| | | |
|---|---|---|
| 1,948,766 | Lyon | Feb. 27, 1934 |
| 2,109,235 | Kolt | Feb. 22, 1938 |
| 2,114,591 | Clark | Apr. 19, 1938 |
| 2,183,256 | Gabler | Dec. 12, 1939 |
| 2,222,788 | Touceda et al. | Nov. 26, 1940 |
| 2,511,914 | Haas | June 20, 1950 |
| 2,631,247 | Shaw | Mar. 10, 1953 |
| 2,654,043 | Freeman | Dec. 29, 1953 |
| 2,839,646 | Hester | June 17, 1958 |
| 2,918,584 | Edsberg et al. | Dec. 22, 1959 |
| 3,062,964 | Lubin | Nov. 6, 1962 |

FOREIGN PATENTS

| | | |
|---|---|---|
| 492,754 | Canada | May 12, 1953 |